(12) United States Patent
Zuilhof et al.

(10) Patent No.: US 6,898,965 B2
(45) Date of Patent: May 31, 2005

(54) ROLLER PAIR FOR A ROLLER TESTING STAND

(75) Inventors: Wouter Zuilhof, Haarlem (NL); Pieter Jacob Moes, Amsterdam (NL)

(73) Assignee: Sun Electric Systems, B.V. (NL)

( * ) Notice: Subject to any disclaimer, the term of this patent is extended or adjusted under 35 U.S.C. 154(b) by 241 days.

(21) Appl. No.: 09/783,593

(22) Filed: Feb. 15, 2001

(65) Prior Publication Data

US 2001/0020385 A1 Sep. 13, 2001

(30) Foreign Application Priority Data

Feb. 18, 2000 (NL) .............................................. 1014423

(51) Int. Cl.$^7$ .............................................. G01M 19/00
(52) U.S. Cl. ................................................... 73/118.1
(58) Field of Search ............................... 73/118.1, 117, 73/121, 123, 124, 126, 168, 862.18; 180/248; 242/443.1, 330; 414/160; 476/39

(56) References Cited

U.S. PATENT DOCUMENTS 3,718,036 A * 2/1973 Marten et al. ................ 73/117
5,450,748 A * 9/1995 Evans et al. .................. 73/117
5,756,889 A * 5/1998 D'Angelo ..................... 73/117

FOREIGN PATENT DOCUMENTS

| DE | 32 33 960 | 2/1984 |
| DE | 196 35 194 | 4/1998 |
| EP | 0 124 258 | 11/1984 |
| EP | 0 747 688 A1 | 12/1996 |
| GB | 1197623 | 7/1970 |
| GB | 2 211 312 | 6/1989 |

* cited by examiner

Primary Examiner—David Zarneke
Assistant Examiner—Monica D. Harrison
(74) Attorney, Agent, or Firm—Ostrolenk, Faber, Gerb & Soffen, LLP

(57) ABSTRACT

In a roller pair for a roller testing stand with two, commonly driven, rollers the distance of one of them which with respect to the other being adjustable, such as known in itself in a so-callead "universal roller testing stand", the invention proposes, to simplify the driving structure, that of this adjustable roller the axis can be displaced along a circular arc, of which the center essentially coincides with the axis of a driving gear or -wheel, in such a way that during the adjustment the distance to this axis remains constant.

7 Claims, 5 Drawing Sheets

ROLLER PAIR FOR A ROLLER TESTING STAND

FIELD OF THE INVENTION

The invention relates to a roller pair for a roller testing stand, comprising two, commonly driven, rollers, the distance of one thereof with respect to the other being adjustable.

DESCRIPTION OF THE PRIOR ART

Such roller pairs are known in practice; they are, for instance used, in the roller testing stands as marketed by Applicant being of the type Sun TCA 20.

To transmit power or forces to and from respectively the wheels of a motor vehicle which is to be tested, preferably both rollers of a pair must be commonly driven or it must be the possibility that they are driven commonly, while furthermore, to adjust a roller pair to motor vehicle wheels with varying diameter it is preferred that the mutual distance of the rollers is adjustable. This, then, results into a roller pair of the kind as hereabove described.

According to the prior art the rollers of such a pair are commonly driven by means of one single endless transmission element, which in its turn is driven by a roller or wheel on the outgoing shaft of the motor of the testing stand. Necessarily such a structure asks for the presence of a tensioner for the endless transmission element and is thus complicated and costly.

SUMMARY OF THE INVENTION

The invention aims to provide a roller pair which, while retaining the advantages of the known rollers pairs, can be simplier and thus cheaper. This is obtained in that of the adjustable roller the axis thereof can be displaced over a circle arc of which the center essentially coincides with the axis of a driving gear or -wheel.

Preferably the adjustable roller is driven from the driving gear or -wheel by means of an endless transmission element.

In a preferred embodiment the outgoing shaft of the driving motor protrudes at both sides from the motor housing and carries at each of the outer ends a driving gear or -wheel, one of which driving, by means of the endless transmission element, the fixed roller and the other driving by means of an endless transmission element the displaceable roller, a tilting arm being provided between the respective rollers and the motorhousing, one end thereof being rotatable around the motor axis and the other end carrying a bearing for supporting the displaceable rollers.

In another preferred embodiment each roller shaft is supported at the first end of a pivot arm and is provided with a first, driven, pulley or gear, of which arm the other end is pivotally supported, the pivot axis coinciding with the axis of of a second, driving, pulley or gear, with an endless transmission element being slung around the first and second pulleys or gears, while each of the second pulleys or gears is coaxially coupled to a third and a fourth pulley or gear respectively, and an endless transmission element is slung around the third and fourth pulleys or gears on the one hand and a fifth pulley or gear on the other hand, said fifth pulley or gear being driven by a driving motor. These measures result into a simple and sturdy structure but furthermore they make it possible that the rollers can lie very close to each other indeed so that a vehicle to be tested can be very easily driven over the rollers and the usual retractable supporting plate between the rollers can be omitted.

The claimed exclusive rights also include a roller testing stand provided with at least one roller pair as described above.

DESCRIPTION OF THE PREFRRED EMBODIMENTS

Figure 1:
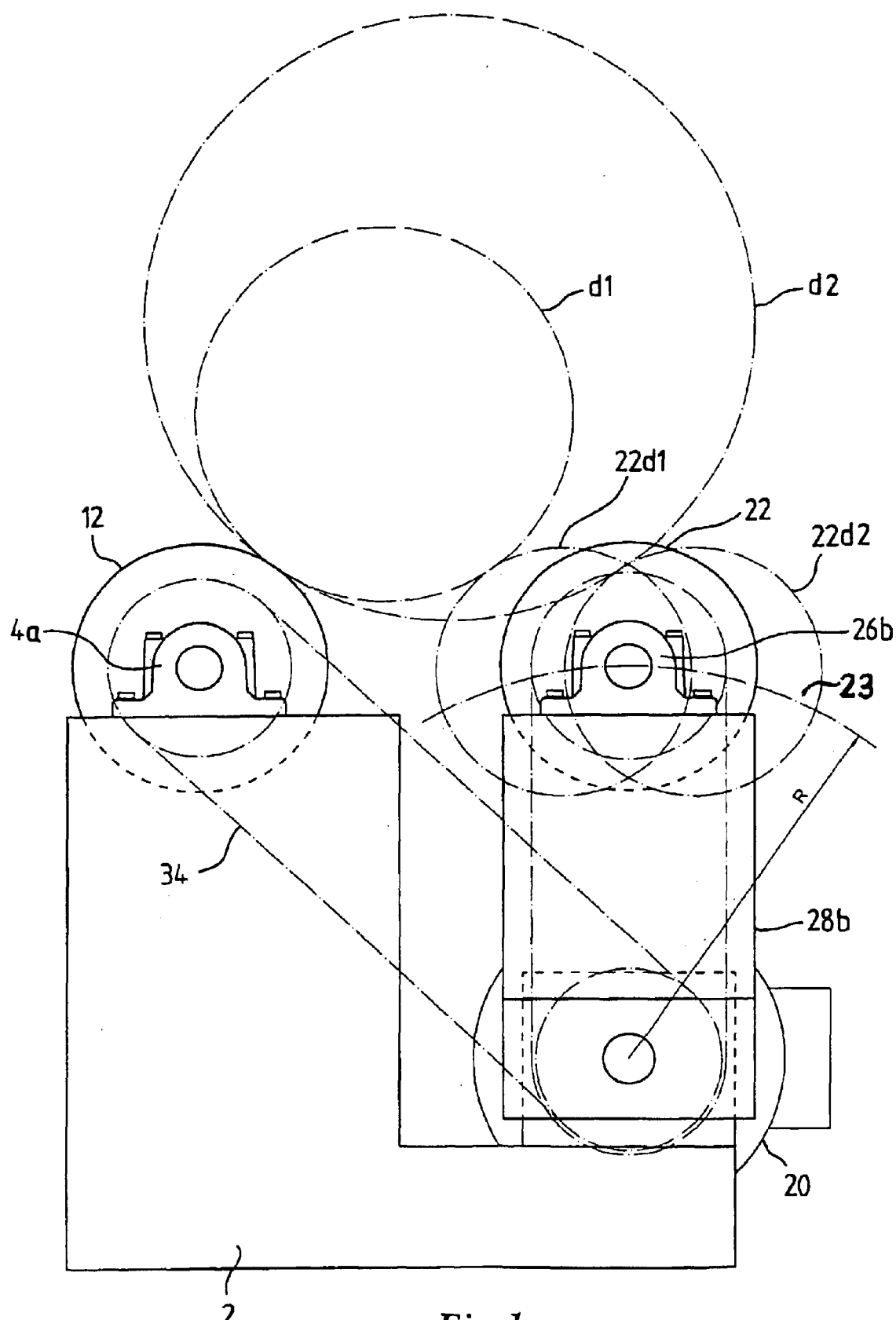
FIG. 1 is a side view of a roller pair according to the invention, the rollers being shown in the middle position and the two extreme positions.
Figure 2:
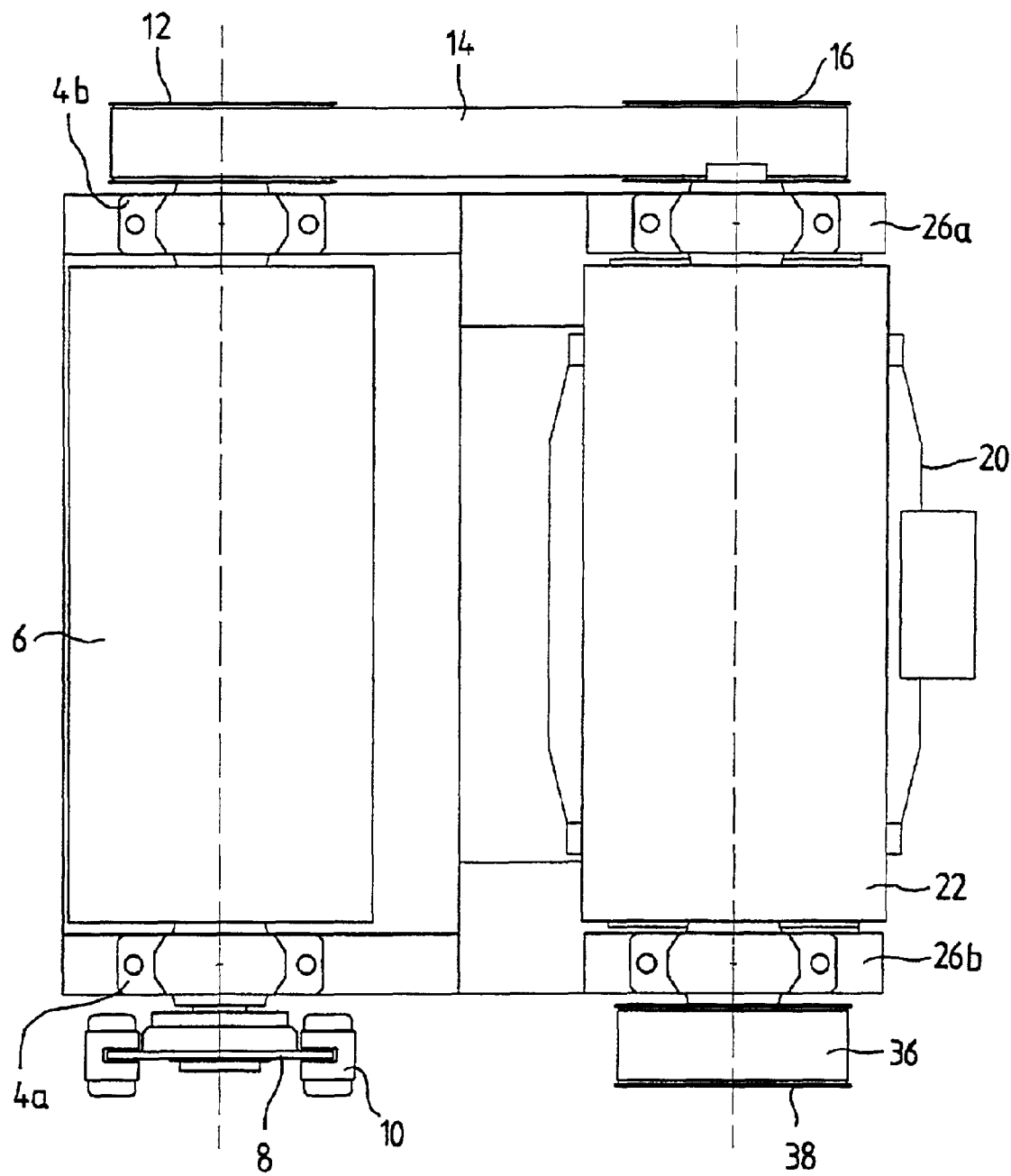
FIG. 2 is an upper view of this roller pair.
Figure 3:
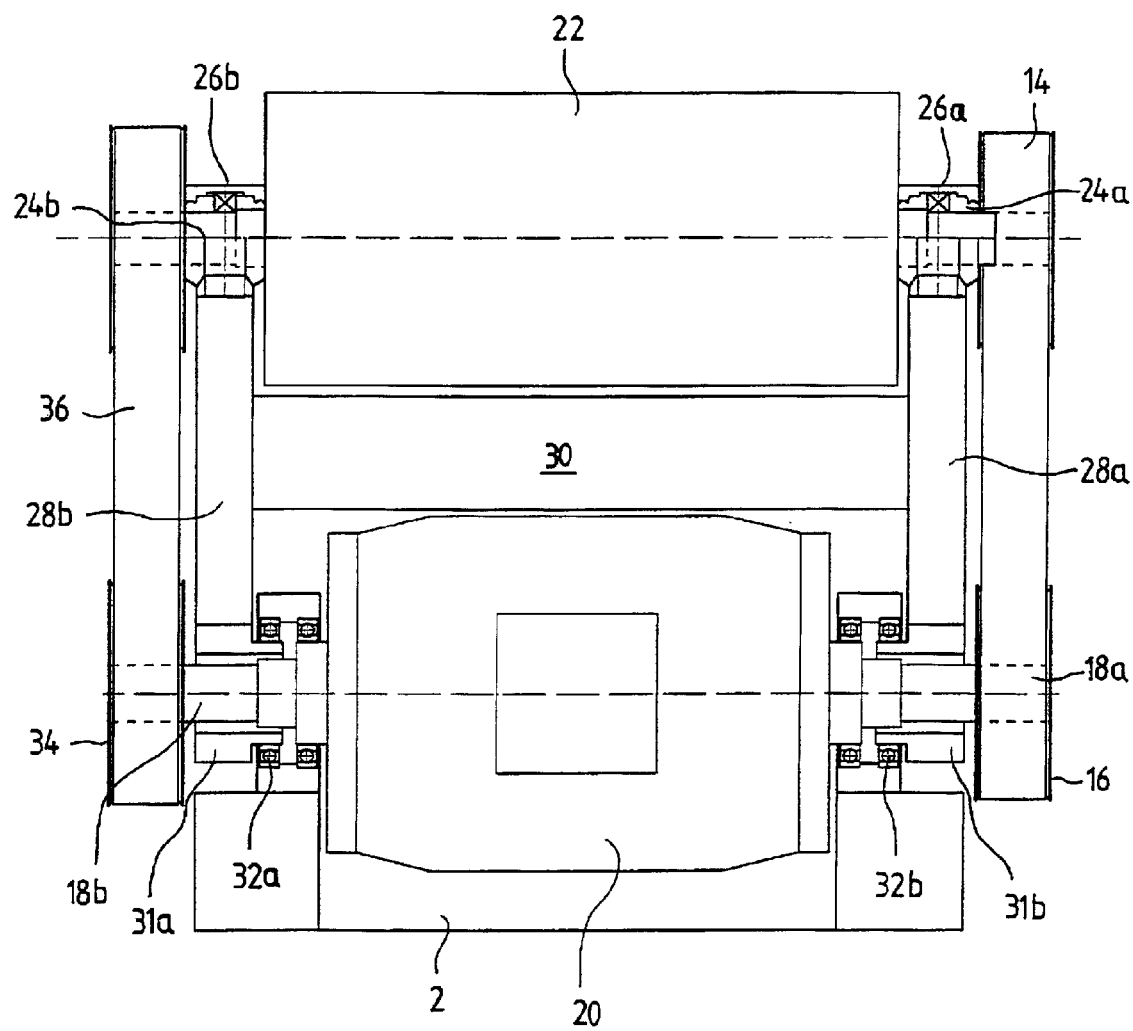
FIG. 3 is a front view of this roller pair.

The roller pair according to the FIGS. 1–3 is accommodated in a fixed frame 2 with a pair of fixed bearings 4a, 4b which support the shaft ends of a first, stationary, roller 6. One of the shaft ends supports a brake disk 8 which cooperates with a brake claw 10 and the other shaft end supports a pulley 12 around which is slung a first, endless belt 14. This belt is also slung around a pulley 16 supported on the first shaft end 18a of an electric motor 20, fixed to the frame 2.

A second roller 22 is supported with its shaft ends 24a, 24b in bearing housings 26a, 26b which are fixed to the ends of supporting pivoting arms 28a, 28b of a supporting frame which are interconnected via a cross-member 30. At the motor side the supporting arms 28a, 28b are, via bushes 31a, 31b, supported in bearings 32a, 32b, coaxially with the motor shaft end 18a, 18b. The second shaft end 18b supports the pulley 34 which drives, via an endless belt 36, the pulley 38 on the shaft of the, adjustable, roller 22.

FIG. 1 shows the effect as obtained with the structure according to the invention. The diameter of a wheel of a vehicle to be tested with the roller testing stand can, for instance, vary between the diameter as indicated with $d_1$ and $d_2$ respectively; to support a wheel with diameter $d_1$ the adjustable roller should have the position as indicated with the circle $22d_1$ while, for a correct support of a wheel with diameter $d_2$, this roller should have the position as indicated with $22d_2$. This is obtained by tilting the pivoting arms 28a, 28b around the axis of the motor 20 so that the axis of roller 22 describes part of a circle arc 23 with radius R, until the correct position is obtained, and then the arms are fixed in this position. The adjusting and fixing mechanism necessary thereto is for clarity purposes not shown in the drawing.

Within the scope of the invention many variations are possible, particularly in the way in which the rollers are driven. The driving belt can, of course, be replaced by a chain but it is also possible to drive the adjustable roller by means of a shaft perpendicular to the axis of the motor and the roller and provided with conical wheels at its outer ends, although this is somewhat costlier.

Figure 4:
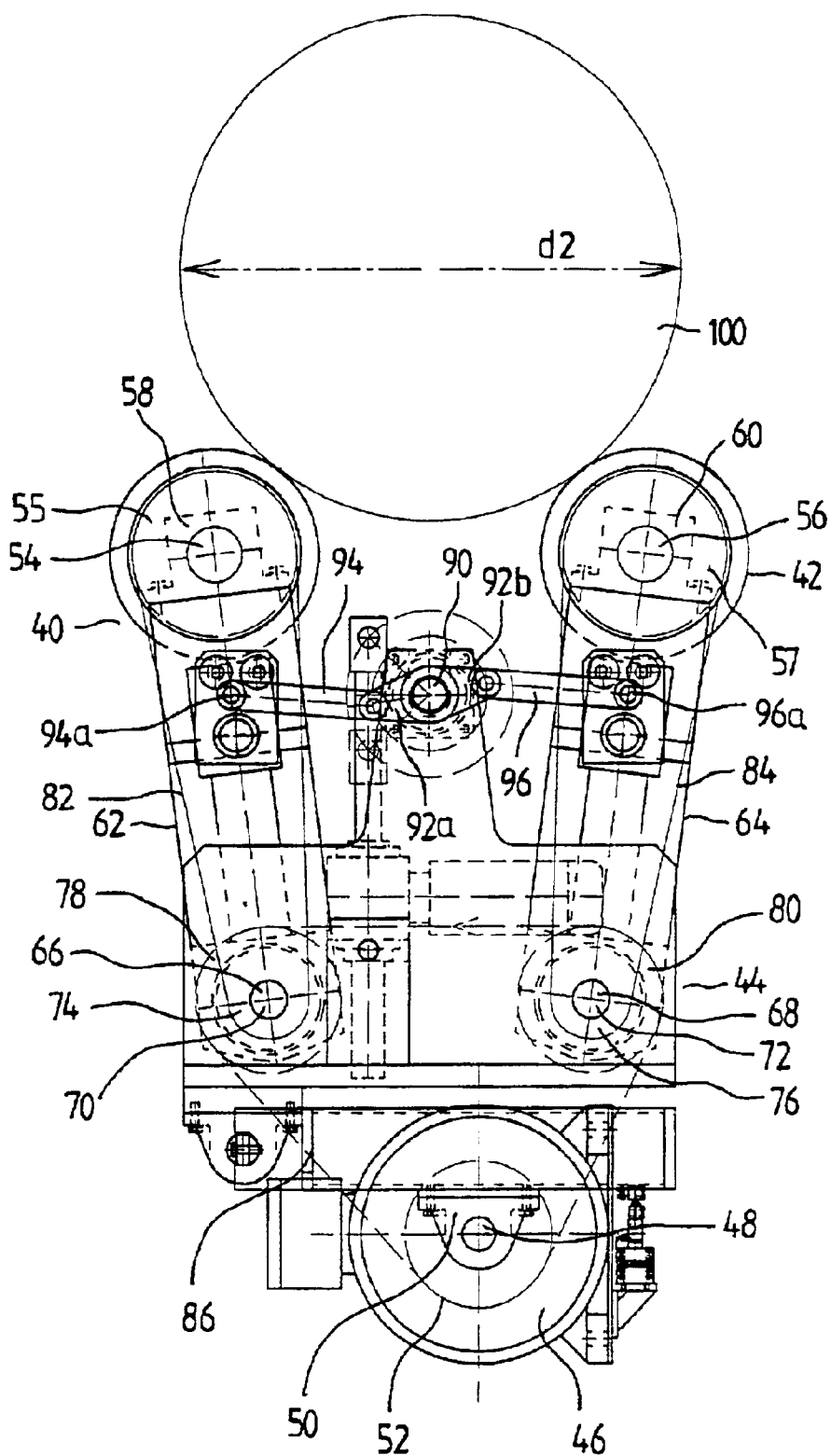
FIG. 4 is a side view of a second embodiment of a roller pair according to the invention with the rollers in their outermost position.
Figure 5:
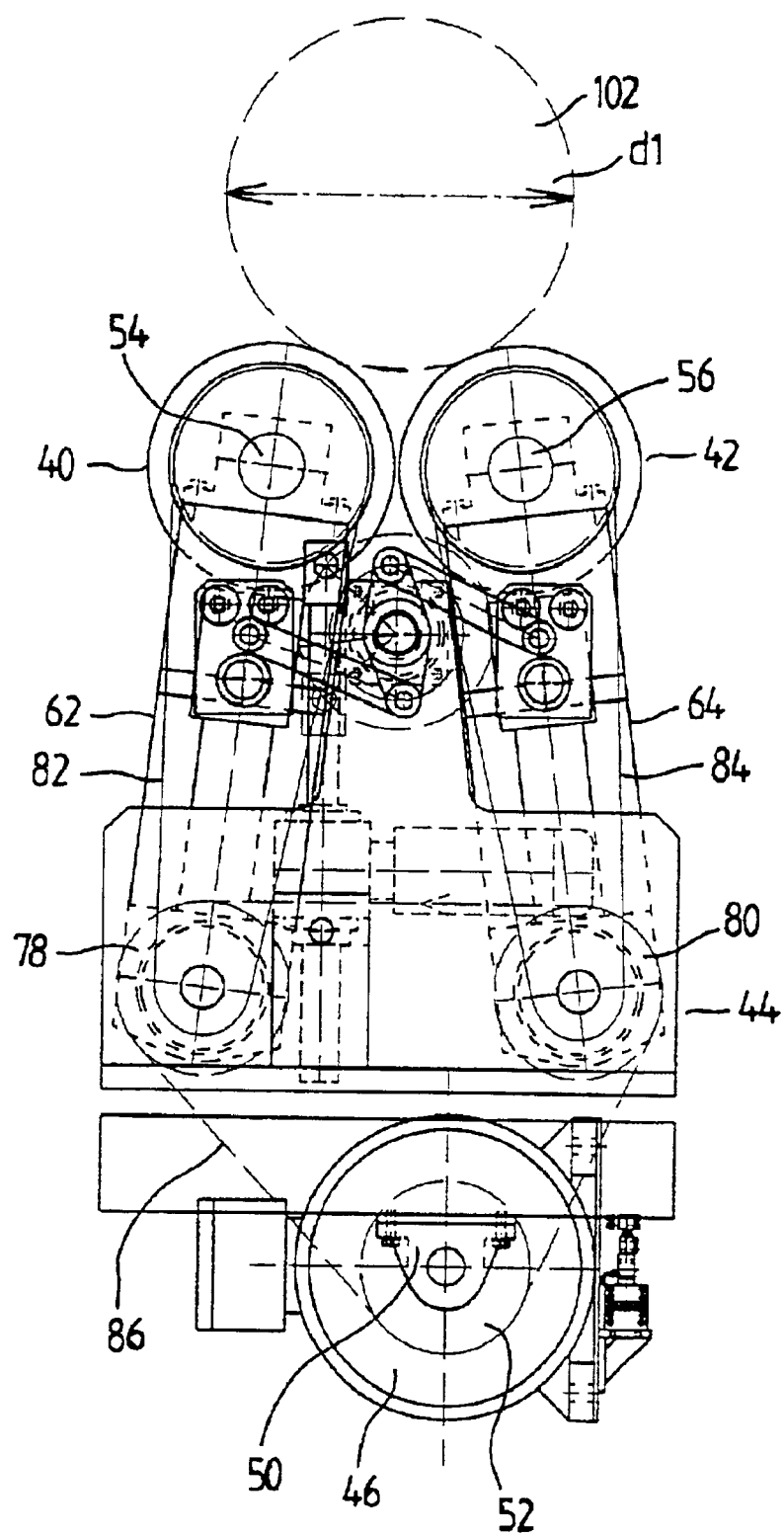
FIG. 5 is a similar view but now with the rollers in their innermost position.

The embodiment according to the FIGS. 4 and 5 differs somewhat from the one described hereinbefore and this different structure results into several improvements. The principle of operation, however, remains the same.

As the FIGS. 4 and 5 show a pair of rollers, comprising the first roller 40 and the second roller 42, is accommodated in a common frame 44. Such a frame is part of a complete roller testing stand (not further shown).

The frame 44 carries the electrical driving motor 46 with on its output shaft 48 and accommodated in the bearing block 50 the driving pulley or gear wheel 52. Each roller 40, 42 has its shaft 54, 56 respectively supported in a bearing block 58, 60 respectively, provided at the end of a supporting pivot arm 62, 64. Each arm 62, 64 respectively is accommodataed by means of suitable bearings (not shown) in frame 44, the axis of rotation of said bearing being denoted with reference numeral 66 and 68 respectively. This axis 66, 68 corresponds to the axis of a shaft 70, 72; each shaft 70, 72 respectively carries two intercoupled pulleys or gear wheels: a smaller one, denoted with 74, 76 and a somewhat larger one denoted with 78, 80. The shaft 54 of roller 40 carries the pulley or gear wheel 55 while the shaft 56 of roller 42 carries the pulley or gear wheel 57. A first endless transmission element, such as a driving belt or driving chain 82 is slung around the pulleys (or gears) 55 on the one hand and 74 on the other hand while a second similar transmission element 84 is slung around the pulleys (or gears) 57 on the one hand and 76 on the other hand. A third endless transmission element 86 is slung around the pulleys 52, 78 and 80 so that by means of this transmission element 86 the driving motor 46 can drive the rollers 40, 42 while, in turn, the rolles 40 and 42 can drive via the above mentioned pulleys or gears the shaft 48 of the motor 46 or a brake, coupled thereto (not shown).

Of course there must be suitable means for adjusting the mutual distance between the rollers 40 and 42 in any of the intermediate positions between the outermost position shown in FIG. 4 and the innermost position shown in FIG. 5 and preferably this mechanism is the one as shown in the drawings. In the space between the arms 62, 64 the frame carries a shaft 90 on which is fixed a lever with the two arms 92a and 92b; each end of such an arm is pivotally connected to a control rod 94, 96 and the respective outer ends 94a, 96a thereof are pivotally connected to the tilting arm 62 and 64 respectively. By rotating the control shaft 90 the pivot ends of the arms 92a, 92b rotate around this shaft from the position shown in FIG. 4 to the position shown in FIG. 5.

FIG. 5 also shows how the measures according to the invention make it possible to set up a minimum distance between the rollers 40 and 42 respectively and this distance can easily be, in practice, so small that a vehicle can be driven over the combination of the two rollers without being hindered in any way. This makes it possible that the usual vertically adjustable supporting plate which is necessary for roller pairs of which the mutual distance cannot be as small as one should want it to be, be omitted.

Preferably a controlled coupling (not shown for clarity purpose) is provided between the shaft 54 or 56 and the corresponding pulley or gear 55, 57 respectively so that the roller can rotate freely when a vehicle is driven over them.

FIG. 4 shows how the rollers 40, 42 support in the outer position a wheel 100 with diameter d2 while FIG. 5 shows how they support in their inner position a wheel 102 with diameter d1.

What is claimed is:

1. A roller pair for a roller testing stand, comprising: two commonly driven wheel support rollers, a first of the rollers being adjustable so that a distance of the first roller with respect to a second of the rollers is adjustable, the first roller being movably arranged so that an axis of the first roller is displaceable along a path defined by a circle arc having a center that substantially coincides with an axis of a driving gear or wheel.

2. The roller pair according to claim 1, and further comprising an endless transmission element arranged between the driving gear or wheel and the adjustable first roller so that the adjustable first roller is driven by the driving gear or wheel.

3. The roller pair according to claim 1, and further comprising: a driving motor having a housing and an outgoing shaft that protrudes at both ends from the motor housing, a driving gear or wheel being arranged at each end of the outgoing shaft; a first endless transmission element arranged between the fixed roller and the driving gear or wheel at a first end of the outgoing shaft; a second endless transmission element arranged between the adjustable roller and the driving gear or wheel at a second end of the outgoing shaft; and a tilting arm provided between the respective rollers and the motor housing, one end of the arm being rotatable around an axis of the motor, and another end of the arm having a bearing that supports the displaceable roller.

4. The roller pair according to claim 1, wherein each of the rollers has a shaft, and further comprising: two pivot arms having a first ends that support the roller shafts; a first, driven pulley or gear being provided on each roller shaft, the second end of the pivot arms being pivotally supported so as to have a pivot axis that coincides with an axis of a second, driving pullet or gear; a first endless transmission element arranged around the first and second pulleys or gears, each of the second pulleys or gears being coaxially coupled with a third pulley or gear and a fourth pulley or gear, respectively; a driving motor having a fifth pulley or gear; and a second endless transmission element arranged around the fifth pulley or gear and the third and fourth pulleys or gears.

5. The roller pair according to claim 4, and further comprising a controlled coupling between at least one of the rollers and a corresponding pulley or gear.

6. The roller pair according to claim 4, and further comprising: a control shaft centrally located in a space between the two arms; a control lever rotatable around the control shaft and having ends; and two connecting rods each having one end pivotally connected to a respective end of the control lever, each pivot arm being pivotally connected to another end of a respective one of the connecting rods, each connecting rod being directed toward the pivot arm not connected to the connecting rod.

7. A roller testing stand comprising a roller pair having two commonly driven wheel support rollers, a first of the rollers being adjustable so that a distance of the first roller with respect to a second of the rollers is adjustable, the first roller being movably arranged so that an axis of the first roller is displaceable along a path defined by a circle arc having a center that substantially coincides with an axis of a driving gear or wheel.

* * * * *